United States Patent
Zhang et al.

(10) Patent No.: US 9,621,425 B2
(45) Date of Patent: *Apr. 11, 2017

(54) METHOD AND SYSTEM TO ALLOCATE BANDWIDTH FOR HETEROGENEOUS BANDWIDTH REQUEST IN CLOUD COMPUTING NETWORKS

(71) Applicant: Ericsson AB, Stockholm (SE)

(72) Inventors: Ying Zhang, San Jose, CA (US); Dan Li, Beijing (CN); Jing Zhu, Beijing (CN)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 973 days.

This patent is subject to a terminal disclaimer.

(21) Appl. No.: 13/851,694

(22) Filed: Mar. 27, 2013

(65) Prior Publication Data

US 2014/0297864 A1  Oct. 2, 2014

(51) Int. Cl.
G06F 15/173 (2006.01)
H04L 12/24 (2006.01)
H04L 29/08 (2006.01)

(52) U.S. Cl.
CPC ...... H04L 41/0896 (2013.01); H04L 41/5096 (2013.01); H04L 67/101 (2013.01)

(58) Field of Classification Search
None
See application file for complete search history.

(56) References Cited

U.S. PATENT DOCUMENTS

| 6,104,701 A | 8/2000 | Avargues |
| 6,721,275 B1 | 4/2004 | Rodeheffer et al. |
| 7,386,851 B1* | 6/2008 | Zyuban ............ G06F 9/50 709/223 |
| 7,886,183 B2 | 2/2011 | Krishnan et al. |
| 8,799,557 B1* | 8/2014 | Chen ............ G06F 12/0638 711/103 |

(Continued)

OTHER PUBLICATIONS

Notice of Allowance for U.S. Appl. No. 13/791,316, mailed Mar. 9, 2015, 8 pages.

(Continued)

*Primary Examiner* — Joshua Joo
*Assistant Examiner* — Younes Naji
(74) *Attorney, Agent, or Firm* — Patents on Demand P.A.; Brian K. Buchheit; Scott M. Garrett

(57) ABSTRACT

A method implemented by a network service provider to provide a virtual network to tenants requiring bandwidth in a cloud computing environment, where the virtual network includes a first set of one or more virtual switches that manage a second set of one or more physical servers that host virtual machines (VMs). The method starts with receiving by one virtual switch a request for a first plurality of VMs, where at least one VM of the first plurality of VMs contains a bandwidth different from bandwidths of the rest of one or more VMs. The it is determined whether to accept the request for the first plurality of VMs by calculating a set of allocation ranges (ARs) associated to the virtual switch, wherein each AR of the set of ARs denotes at least one discontinuous VM allocation space within a virtual switch. Then VMs are allocated for the request.

25 Claims, 13 Drawing Sheets

(56) References Cited

U.S. PATENT DOCUMENTS

| | | | |
|---|---|---|---|
| 2006/0092944 A1* | 5/2006 | Wingard | H04L 49/109 370/395.2 |
| 2006/0203745 A1 | 9/2006 | Acharya et al. | |
| 2011/0142053 A1 | 6/2011 | Van Der Merwe et al. | |
| 2013/0014101 A1* | 1/2013 | Ballani | H04L 67/101 718/1 |
| 2013/0031559 A1 | 1/2013 | Alicherry | |
| 2013/0275974 A1 | 10/2013 | Cao et al. | |

OTHER PUBLICATIONS

Dinan, James et al., "Efficient Multithreaded Context ID Allocation in MPI", Sep. 23, 2012, 10 pages.

Al-Fares, Mohammad, et al., "A Scalable, Commodity Data Center Network Architecture", Aug. 2008, 12 pages, SIGCOMM' 08, ACM 978-1-60558-175-0/08/08, Seattle, Washington, USA.

Ballani, Hitesh, et al., "Towards Predictable Datacenter Networks", Aug. 15-19, 2011, 12 pages, SIGCOMM'11, Toronto, Ontario, Canada.

Crowcroft, Jon, et al., "Differentiated End-to-End Internet Services Using a Weighted Proportional Fair Sharing TCP", Jun. 30, 1998, 17 pages.

Guo, Chuanxiong, et al., "BCube: A High Performance, Server-centric Network Architecture for Modular Data Centers", Aug. 2009, 12 pages, SIGCOMM' 09, ACM 978-1-60558-954-9/09/08, Barcelona, Spain.

Guo, Chuanxiong, et al., "SecondNet: A Data Center Network Virtualization Architecture with Bandwidth Guarantees", Nov. 30-Dec. 3, 2010, 12 pages, ACM CoNEXT 2010, Philadelphia, USA.

Pan, Rong, et al., "QCN: Quantized Congestion Notification", 2007, 26 pages.

Shieh, Alan, et al., "Sharing the Data Center Network", 2011, 14 pages.

Zhu, Jing, et al., "Towards Bandwidth Guarantee in Multi-tenancy Cloud Computing Networks", Oct. 30, 2012, 10 pages.

Zhang, Ying, et al., "A Method and System to Allocate Bandwidth in Cloud Computing Networks", corresponding to U.S. Appl. No. 13/663,416, filed Oct. 29, 2012.

Zhang, Ying, "Network Bandwidth Allocation in Multi-Tenancy Cloud Computing Networks", corresponding to U.S. Appl. No. 13/791,316, filed Mar. 8, 2013.

Notice of Allowance, U.S. Appl. No. 13/663,416, dated May 30, 2014, 17 pages.

Gurusamy, Mohan et al., "An Integrated Resource Allocation Scheme for Multi-Tenant Data-center", Local Computer Networks IEEE 37th Conference, 2012, 9 pages.

Kumar Das, Subir et al., "Weight Based Multicast Routing Protocol for Ad hoc Wireless Networks", Nov. 17, 2002, 5 pages, IEEE.

Zhang, Ying, "A Method and System to Allocate Bandwidth for Heterogeneous Bandwidth Request in Cloud Computing Networks", Corresponding to U.S. Appl. No. 13/851,694, filed Mar. 27, 2013, 27 pages.

Notice of Allowance, U.S. Appl. No. 13/663,416, dated Sep. 8, 2014, 6 pages.

Non-Final Office Action, U.S. Appl. No. 13/791,316, dated Jan. 2, 2015, 12 pages.

* cited by examiner $$AR^{3,\,12}(i) = \{[0,4], [7,8], [10, 11]\}$$

1  AggregateAR($x$, $y$, $AR_q^{x,y}(t)$)
   Input: $x$: smallest VM sequence in the group;
   $y$: largest VM sequence in the group.
   Output: $AR_1^{x,y}(t)$.
2  $AR_1^{x,y}(t) \leftarrow \emptyset$;
3  for each extended section
   $[(e_q^i)_q^{x,y}(t), (e_q^r)_q^{x,y}(t)] \in \{AR_q^{x,y}(t)\}$ do
4  $\quad AR_1^{x,y}(t) \leftarrow AR_1^{x,y}(t) \cup [(e_q^i)_q^{x,y}(t), (e_q^r)_q^{x,y}(t)] +$
   $\quad\quad$ AddBasic$(x + (e_q^i)_q^{x,y}(t), y, z)$;
5  end
6  $AR_1^{x,y}(t) \leftarrow AR_1^{x,y}(t) \cup [0, \textbf{AddBasic}(x, y, -1)]$;
7  return $AR_1^{x,y}(t) \cap [0, y - x + 1]$;
8
   AddBasic$(x, y, t)$
   Input: $x$: smallest VM sequence in the group;
   $y$: largest VM sequence in the group;
   $t$: excluded child node.
   Output: $u$: upper bound of the aggregated basic section.
9  $u \leftarrow 0$;
10 $S \leftarrow \{0, 1, \ldots, r - 1\}$;
11 while $S \neq \emptyset$ & $x \leq y$ do
12 $\quad b^{x,y}(max) \leftarrow \max_{x \leq i \leq r-1, i \in S} b^{x,y}(i)$;
13 $\quad$ if $max \neq t$ then
14 $\quad\quad u \leftarrow u + b^{x,y}(max)$;
15 $\quad\quad y \leftarrow y - b^{x,y}(max)$;
16 $\quad$ end
17 $\quad S \leftarrow S/\{(max)\}$;
18 end
19 return $u$;

METHOD AND SYSTEM TO ALLOCATE BANDWIDTH FOR HETEROGENEOUS BANDWIDTH REQUEST IN CLOUD COMPUTING NETWORKS

CROSS-REFERENCE TO RELATED APPLICATIONS

This application is related to co-pending U.S. patent application Ser. No. 13/663,416, entitled "Method and System to Allocate Bandwidth in Cloud Computing Networks," filed on Oct. 29, 2012, and U.S. patent application Ser. No. 13/791,316, entitled "Network Bandwidth Allocation In Multi-Tenancy Cloud Computing Networks," filed on Mar. 8, 2013, which are hereby incorporated by reference.

FIELD OF INVENTION

The embodiments of the invention are related to the field of cloud computing networks. More specifically, the embodiments of the invention relate to a method and system for allocating bandwidth to tenants requiring bandwidth in a cloud computing networks.

BACKGROUND

Cloud computing has transformed the way applications are created and run in recent years. It employs the Infrastructure as a Service (IaaS) model in which customers outsource their computing and software capabilities to third party infrastructures and pay for the service usage on demand. Compared to the traditional computing model that uses dedicated, in-house infrastructures, cloud computing provides many advantages, including economies of scale, dynamic provisioning, and low capital expenditures. It allows customers to establish and rapidly expand a global presence in minutes rather than days or months, with the "pay-as-you-go" charging model.

Despite the tremendous momentums it grows, many companies are still reluctant to move their services or enterprise applications to the cloud, due to reliability, performance, security and privacy concerns. To maximize economic benefits and resource utilization, multiple virtual machines (VM) are simultaneously initiated to execute on the same physical server. Many network service providers, including cloud providers, use host based virtualization technologies to realize separation and performance isolation between VMs on the end-host level. In the network that interconnects hosts, the same set of physical routers and links are deployed to carry traffic for all customers indistinguishably. In this kind of infrastructure, the network service providers do not offer guaranteed network resources to tenants. Therefore, the bandwidth between VMs of the same tenant can vary significantly over time, depending on the network load and usage from other tenants. This kind of bandwidth variation in a cloud computing environment hinders a tenant's capability to operate efficiently and to carry on mission critical activities. Network service providers need more efficient network resource allocation methods.

SUMMARY

A method implemented by a network service provider to provide a virtual network to tenants requiring bandwidth in a cloud computing environment, where the virtual network includes a first set of one or more virtual switches that manage a set of one or more physical servers that host virtual machines (VMs). The method starts with receiving by at least one virtual switch a request for a first plurality of VMs, where at least one VM of the first plurality of VMs contains a bandwidth different from bandwidths of the rest of one or more VMs within the first plurality of VMs. Then the at least one virtual switch determines whether to accept the request for the first plurality of VMs by calculating a set of allocation ranges (ARs) associated to the virtual switch, where each AR of the set of ARs denotes at least one discontinuous VM allocation space within the virtual switch and then VMs are allocated for the request for the first plurality of VMs.

A network device serves as a virtual switch for a network service provider to provide a virtual network to a tenant requiring bandwidth in a cloud computing environment, where the virtual network includes a first set of one or more virtual switches that manage a second set of one or more physical servers that host virtual machines (VMs). The network device comprises a user interface module configured to receive a request for a first plurality of VMs, where at least one VM of the first plurality of VMs contains a bandwidth different from bandwidths of the rest of one or more VMs within the first plurality of VMs. It also comprises an allocation range (AR) calculation module configured to calculate a set of ARs associated to the virtual switch to determine whether to accept the request of the first plurality of VMs by calculating a set of allocation range (ARs) associated to the virtual switch, where each AR of the set of ARs denotes at least one discontinuous VM allocation space within the virtual switch. The network device further comprises a VM allocation module configured to allocate VMs for the request for the first plurality of VMs in response to the determination to accept the first plurality of VMs.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 9 illustrates a pseudo code procedure utilized to calculate $AR^{x,y}_1(i)$ on node i according to one embodiment of the invention.

FIG. 12 illustrates a pseudo code procedure utilized to allocate the set of VMs to each child node j on node i for heterogeneous bandwidth request according to one embodiment of the invention.

DETAILED DESCRIPTION

Figure 1:
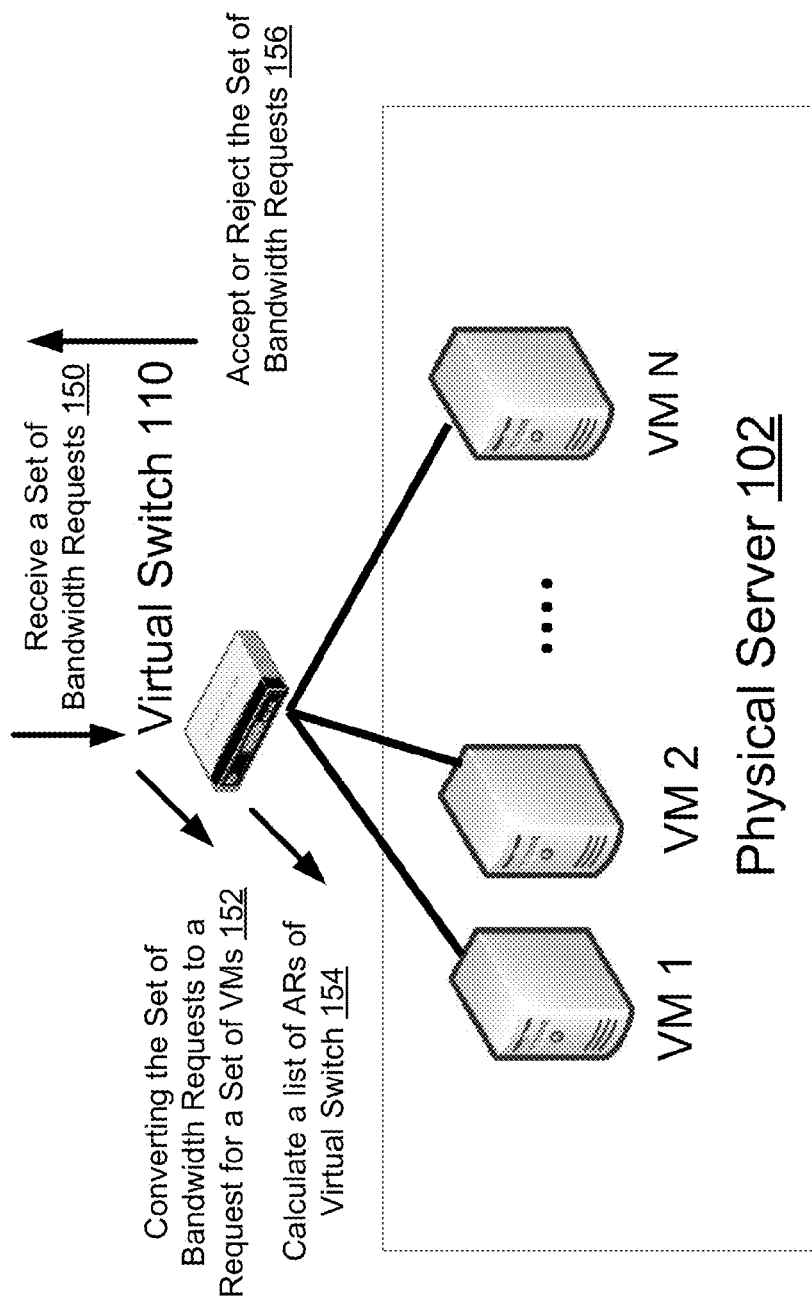
FIG. 1 is a block diagram illustrating a network configuration and its associated operation according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In a cloud service environment, an ideal network resource allocation method may have several desirable features. First, it may allow tenants to specify the demand of their applications in an intuitive way and support flexible updates. More specifically, on the one hand, it needs to maintain the simplicity of the interface between tenants and providers for configuring different services. On the other hand, the tenants should be able to specify various types of demand requirements. The allocation method should allow that the tenant's request can be satisfied during the whole duration of the usage. Second, the provider may be able to leverage the advantage of multiplexing to support many virtual networks on their physical network. The greater the amount of sharing is, the more revenue the cloud provider gets. Third, the allocation method may scale with the size of the tenant. If the bandwidth request of a tenant exceeds the network capacity of the cloud, a rejecting decision should be given to the tenant as soon as possible, so that the tenant can adjust its request or choose other cloud providers. If the tenant request can be accepted, the VM allocation should also be completed quickly to allow the tenant launching its application tasks earlier. The present invention proposes a method and system of resource allocation that contains these features.

In the co-pending U.S. patent application Ser. No. 13/663,416 cited in paragraph [0001], a method and system to allocate bandwidth in cloud computing networks is disclosed. The method and system disclosed can be utilized when a tenant is allocated the same bandwidth for each allocated VM. For example, a bandwidth request of a tenant can be converted to as a request of N VMs. The requested bandwidth for each VM can be denoted as Bi ($0 \leq i < N$, where N is the total number of VMs requested by the tenant). In the co-pending U.S. patent application Ser. No. 13/663,416, $Bi=B$, that is, each VM allocates same bandwidth. This model of same bandwidth request for each VM is referred to as homogenous bandwidth request. While modeling using homogenous bandwidth request is useful for many applications, in other applications, the modeling may not sufficiently reflect tenant's bandwidth need. In profiling of real world applications in cloud networks, it has found that bandwidth consumption of different VMs belonging to the same tenant can be drastically different. For example, different types of VMs are used for different applications. Some VMs run web services that transfer significant amount of requests and responses in the networks, other VMs only have limited network activities, still others run on databases periodically transferring huge amount of data. Modeling with homogenous bandwidth requests may not adequately account for diversity of bandwidth requests from a tenant, and it may results in increasing cost to the tenant as the tenant likely requests for the maximum bandwidths for all its allocated VMs. It also may results in unnecessary bandwidth waste for the cloud provider.

Thus, in this specification, embodiments of the invention assume the requested bandwidth for each VM can be different, i.e., $B_i \neq B_j$ when $i \neq j$ ($0 \leq i < N$ and $0 \leq j < N$) is true for at least one pair of i and j in the set of bandwidth requests Bi ($0 \leq i < N$). This modeling is referred to as heterogeneous bandwidth request. With the set of bandwidth requests of $<B_0, B_1, \ldots, B_{N-1}>$, the tenant may request a non-blocking virtual network infrastructure to provide the network service, i.e., there is no oversubscription in the virtual network allocated to the tenant. This assumption requires more network resource from cloud providers, but offers better service to the tenant as if all the VMs are connected to a non-blocking virtual switch. The tenant may also request an oversubscribed virtual network infrastructure. Embodiments of the invention apply to both non-blocking and oversubscribed virtual networks.

FIG. 1 is a block diagram illustrating a network configuration and its associated operation according to one embodiment of the invention. In a cloud computing environment, tenants can be subscriber end stations, e.g., servers, workstations, laptops, netbooks, palm tops, mobile phones, smartphones, multimedia phones, Voice Over Internet Protocol (VOIP) phones, user equipment, terminals, portable media players, GPS units, gaming systems, or set-top boxes. These tenants run software applications that require a set of bandwidths. A network service provider (or cloud provider, the terms "network service provider" and "cloud provider" are used interchangeably within the specification) offers virtual network services to tenants by assigning tenants inter-connecting virtual machines (VMs). Tenants do not need to be aware of the underlying physical infrastructure of the virtual networks, but only to concern if the high-level service level agreements (SLAs) can be met. To this end, each tenant can specify her requirement of the network service in terms of topology connectivity, security policy, required bandwidth, and etc. The embodiments of this invention focus on the bandwidth requirement, which is one of most important network performance metrics.

Referring to FIG. 1, a tenant sends a set of bandwidth requests to virtual switch 110 at reference 150. A virtual switch is a device managing and connecting VMs in a cloud computing environment. Virtual switch 110 converts the set of bandwidth requests to a request for a set of VMs at reference 152. As discussed herein, each VM of the set of VMs may have a different bandwidth capacity. The set of VMs may contain VMs of different types/roles. For example, the VM processing traffic exchanges between a front end server and an accounting system may be different types of VM than the VM hosting an intranet database.

Virtual switch 110 then determines whether or not to accept the set of the tenant's bandwidth requests. The determination is based on a new data structure, allocation range (AR), associated with the virtual switch. For a heterogeneous bandwidth request, a set of ARs associated with virtual switch 110 is calculated at reference 154. Each AR of a virtual switch is calculated based on a number of factors as discussed in more detail herein below. Assuming that virtual switch 110 determines it has enough resources to allocate bandwidth for the set of bandwidth requests, it proceeds to allocate VMs on physical server 102 and let the tenant know (e.g., with an accept message) at reference 156. If virtual switch 110 determines it does not have enough resources to allocate bandwidth for the request, it also let the tenant know with a rejection message at reference 156. Note that even though virtual switch 110 is depicted as a separate device, it can be integrated within a physical server. For example, a hypervisor, also called a virtual machine manager (VMM), which manages concurrent virtual machine sessions of a physical server, may contain the functionality of a virtual switch. In this specification, the terms "physical server" and "server" are used interchangeably. VM1-VM N within physical server 102 may be VMs of different types or roles and they may consume different bandwidths.

Note each VM may have different incoming and outgoing bandwidths. For example, a web server usually receives small size requests but sends out large size content. A tenant may not only specify different bandwidth for each VM, but also specify the bandwidth requirement on two directions separately. The embodiments of the invention can be performed at one direction first to allocate a set of VMs and then the same can be done at the opposite direction, and only when both directions satisfy the set of bandwidth requests, the set of bandwidth requests is accepted.

Figure 2:
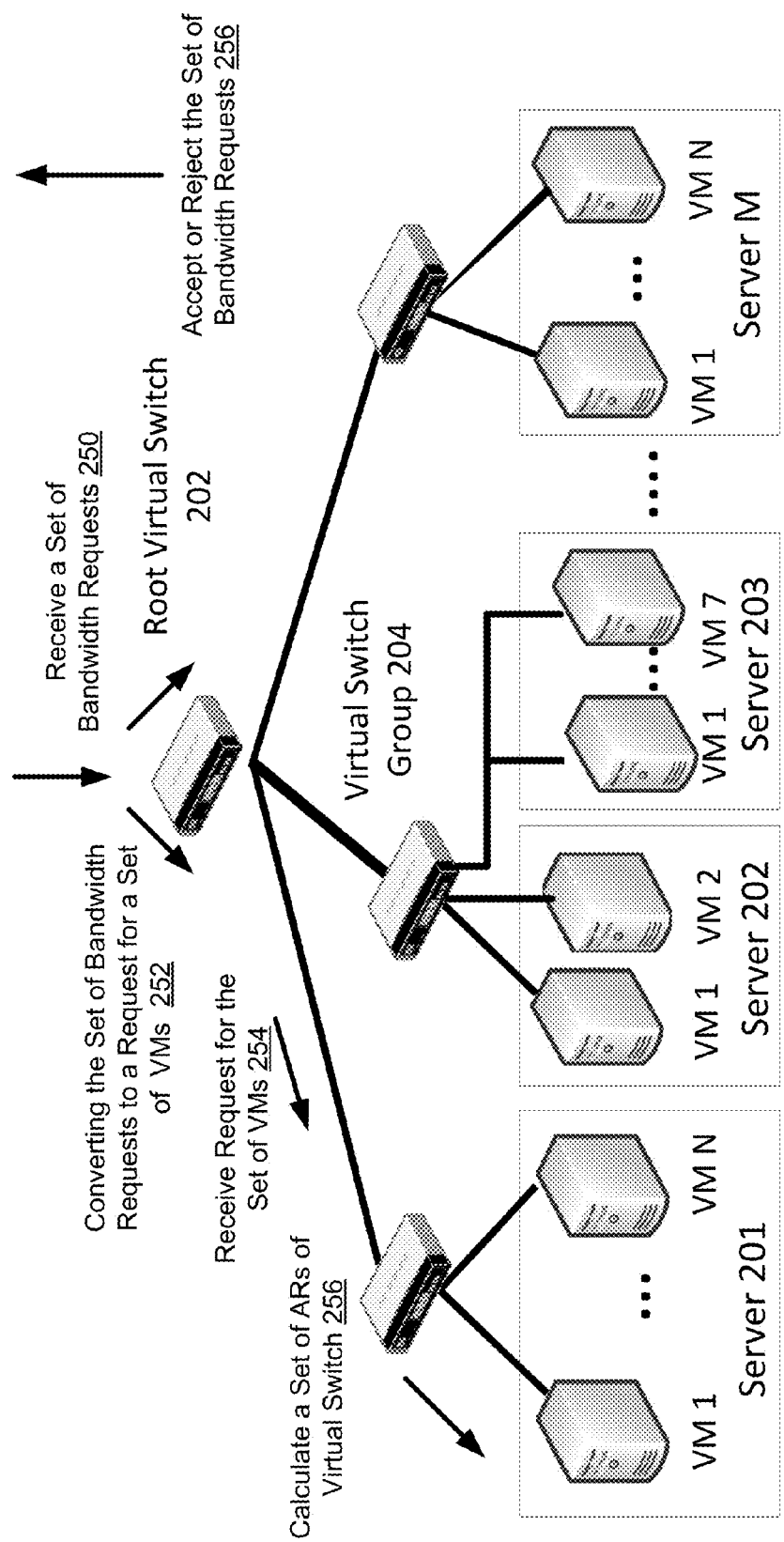
FIG. 2 is a block diagram illustrating another network configuration and its associated operation according to one embodiment of the invention.

FIG. 2 is a block diagram illustrating another network configuration and its associated operation according to one embodiment of the invention. In FIG. 1, the set of tenant's bandwidth requests sends to a virtual switch and the virtual switch controls a physical server containing multiple VMs. FIG. 2 depicts a more complex network configuration. In FIG. 2, root virtual switch 202, interacts with external tenant requests. Root virtual switch 202 manages a group of virtual switches, virtual switch group 204. Each switch of the virtual switch group 204 manages a cluster of physical servers, which contain multiple VMs within. As shown, each switch may contain a different number of servers, and each server may manage a different number of VMs. The VMs may be different types and play different roles for the tenant, thus bandwidth consumption of the VMs are likely different. In a layered virtual switch network as depicted in FIG. 2, only root virtual switch 202 interacts with tenant's requests, and root virtual switch 202 converts tenant's bandwidth requests into a request for a set of VMs, and root virtual switch 202 determines how many VMs and which VMs (since each VM may be associated with a different bandwidth allocation) to be asked to be allocated at each virtual switch it manages below.

Referring to FIG. 2, a tenant sends a set of bandwidth requests to root virtual switch 202 at reference 250. Note each node (e.g., a virtual switch) in a tree based virtual network can be seen as the root node of a subtree rooted at that node. The set of bandwidth requests then is converted to a request of a set of VMs at reference 252. The request of the set of VMs is then relayed to the cluster of virtual switches, virtual switch group 204. The virtual switches within virtual switch group 204 then determine if the requested number and types of VMs can be accommodated within servers they manage at reference 256. Note even though only two levels of virtual switches are depicted in FIG. 2, in practice, many more levels of virtual switches are implemented, and similar methodology of bandwidth allocation can be implemented. In addition, the proposed bandwidth allocation methodology can be implemented in many deferent ways. For example, instead of a root virtual switch, one may use an orchestration layer of a cloud computing environment, where a cloud orchestrator examines incoming bandwidth requests from multiple tenants and determines feasibility of accommodating certain requests and allocating VMs using methods discussed herein. In addition, a virtual switch manager may manage tenant requests and determine feasibility of accommodating certain requests and allocating VMs.

Figure 3:
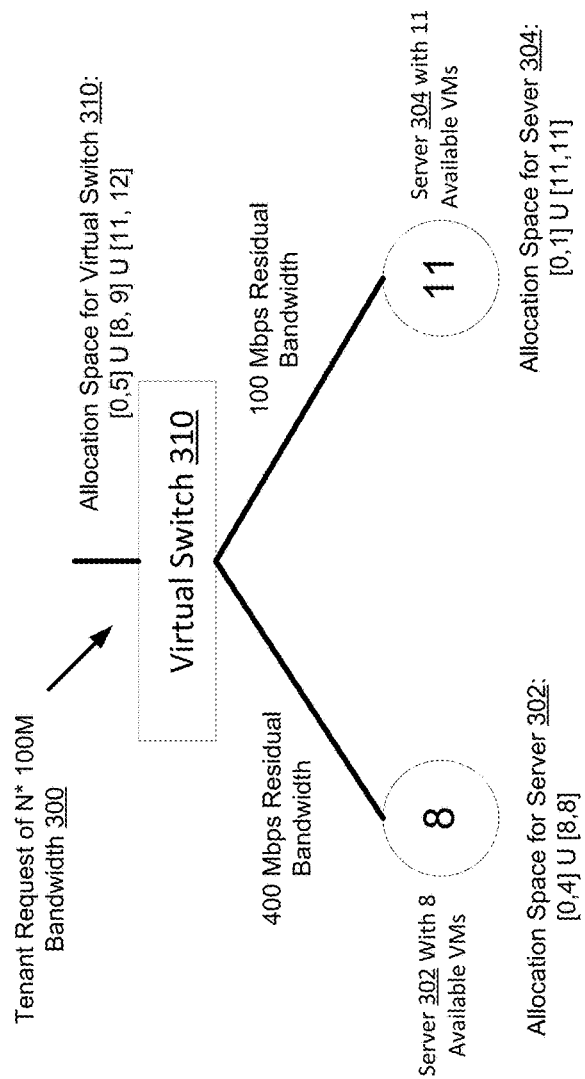
FIG. 3 is a block diagram illustrating bandwidth allocation for a virtual switch and physical servers.

In making accepting or rejecting bandwidth request decision, a virtual switch uses a set of ARs. AR is a data structure denoting availability of VMs for bandwidth requests. The data structure is based on bandwidth allocation for virtual switches and servers. FIG. 3 is a block diagram illustrating bandwidth allocation for a virtual switch and physical servers. In FIG. 3, virtual switch 310 manages server 302 and server 304. There are 400 Mbps and 100 Mbps residual bandwidths between servers 302/304 and virtual switch 310 respectively. Residual bandwidths are bandwidths that are currently available to allocate in a communication path. It is assumed that servers 302 and 304 contain 8 and 11 available VMs respectively with 100 Mbps bandwidth on each VM. It is further assumed that a tenant requests a bandwidth and the bandwidth request is converted to a number of VM with 100M bps required per VM.

Server 302 can accommodate from 0 to 4 VMs in this example. Server 302 always may accept no VM, thus zero VM allocation is feasible. Because the residual bandwidth between server 302 and virtual switch 310 is 400 Mbps, server 302 can take up to four VMs (4×100 Mbps=400 Mbps residual bandwidth). Server 302 cannot allocate more than four VMs because of the residual bandwidth limitation. However, if the tenant allocates all its bandwidth requests to server 302 (thus it does not need to communicate with any other server), the tenant can get the whole eight VMs available VMs. Thus, we may denote the feasible allocation space to be [0, 4] U [8, 8], i.e., server 302 may be allocated either zero to four, or eight VMs. Similarly, the other server managed by virtual switch 310, server 304, may allocate zero to one VM due to 100 Mbps residual bandwidth limitation, or 11 VMs, when the total bandwidth request can be accommodated by server 304. That is, the feasible allocation space for server 304 is [0, 1] U [11, 11].

At virtual switch 310 level, the allocation space [0, 5] is feasible and it is accomplished by allocation space [0, 4] at server 302 and [0, 1] at server 304. The allocation space [8, 9] is also feasible and it is accomplished by allocation space [8, 8] and [0, 1]. Note that this allocation space is feasible because there are 100 Mbps residual bandwidths left on the link between virtual switch 310 and server 304, which is the minimum required for communication between different VMs allocated to a single VM (100M is the basic bandwidth for the tenant). In addition, the allocation space [11, 12] is also feasible for virtual switch 310 and it is accomplished by allocation space [0, 1] at server 302 and allocation space [11, 11] at server 304. Note server 302 cannot allocate anything more than one VM because the residual bandwidth between virtual switch 310 and server 304 is only 100 Mbps and for the VMs belong to a same tenant to communicate, the VMs on server 302 cannot take more bandwidth than the smallest pipe between the two servers. In total, the feasible allocation space for virtual switch 310 is [0, 5] U [8, 8] U [11, 12]. In other words, virtual switch cannot allocate a continuous number of VMs for a given bandwidth request.

Based on the observation that the allocation of VMs may be discontinuous, a new data structure, referred to as allocation range (AR), is used to denote the discontinuous allocation space. An AR can be a bit stream. The length of the bit stream equals to the number of VMs required plus one. In one embodiment, if n VMs can be allocated into the subtree rooted from a node i, the n-th leftmost bit of AR is set as 1 and it is a feasible solution for node i and it is denoted as AR(i). For example, if AR(i) is 11100110, it means that 0, 1, 2, 5, or 6 VMs can be allocated into a subtree rooted from node i. Referring to FIG. 3, for a tenant requesting 12 VMs, the AR has 13 bits. The AR for server 302 thus is 1111100010000 and the AR for server 304 is 1100000000010 respectively. The AR for virtual switch 310 is the combination of the two, and it has an AR of 1111110011011. The AR denotes feasible VM allocation for a requesting tenant. As discussed herein above in the example of FIG. 3, the value of an AR may depend on the number of available VMs and residual bandwidths in the links connecting servers and virtual switches.

Note in the example, the tenant requests bandwidth of N×100M bps. That is, the bandwidth requests can be allocated with the same type of VM (thus homogenous bandwidth request), VM with bandwidth of 100M. The method of allocation of bandwidth for homogenous bandwidth request has been disclosed in the co-pending application Ser. No. 13/663,416. For heterogeneous bandwidth request, e.g., tenant requests of a set of different bandwidths (e.g., 50 Mbps, 78 Mbps, 125 Mbps), the allocation space is harder to determine.

Indeed, it can be shown mathematically that for heterogeneous bandwidth request, finding allocation space is a nondeterministic polynomial time (NP) problem. Suppose there is a set S of 3r positive integers $B_1, B_2, \ldots, B_{3r}$. The sum of these integers is rB, and each integer is between (B/4, B/2). The triple 3-partition problem is to find r subsets $S_1, S_2, \ldots, S_r$ to form a partition of S so that in each subset the sum of integers is equal to B. This is known to be an NP-complete problem. For a cloud-computing network, assume there are r servers linked to a switch. Each server has 3 available VM slots, and the outbound link capacity of each server is B. If it can be determined the acceptability of the heterogeneous request $<B_1, B_2, \ldots, B_{3r}>$ in this network, there must be a corresponding triple 3-partition for these 3r integers. Thus the acceptability determination problem for heterogeneous bandwidth request is a NP-complete problem.

To address the acceptability determination problem for heterogeneous bandwidth request, one may use programming method, which plays as a benchmark for acceptability determination method. The input for the method is the following:

M is the number of physical servers in the network, $a_i(0 \leq i \leq M-1)$ is the number of available VM slots in the i-th server, G is the number of nodes (including both servers and switches) in the network, $c_i(0 \leq i \leq G-1)$ is the residual capacity on the outbound link of the i-th node, $S_i$ is the set of servers located within the sub-tree rooted at the i-th node, N is the total number of VMs in the tenant request, and $B_i(0 \leq i \leq N-1)$ is the bandwidth requirement of the i-th VM in the request.

In addition, a list of programming variables are the following:

$v_{i,j}(0 \leq i \leq N-1, 0 \leq j \leq M-1)$, will be 1 if the i-th VM in the request is allocated to the j-th server, and 0 otherwise.

$w_j$ $(0 \leq j \leq M-1)$ is the aggregated bandwidth requirement of all VMs allocated into the i-th server.

$l_i(0 \leq i \leq G-1)$ is the bandwidth that should be reserved on the outbound link of the i-th node.

$f_i(0 \leq i \leq G-1)$ is the number of available VM slots within the sub-tree rooted at the i-th node after the allocation.

The programming model may be chosen for minimizing the link bandwidth utilization in the allocation enforcement, thus the computation is aimed at solving the following problem:

$$\max L = \sum_{0 \leq i \leq G-1} l_i \quad (1)$$

$$\text{s.t.} \quad l_i = \min\left\{\sum_{j \in S_i} w_j, \sum_{j \notin S_i} w_j\right\} \quad (2)$$

$$w_i = \sum_{0 \leq j \leq n-1} v_{i,j} B_j \quad (3)$$

$$\sum_{0 \leq j \leq N-1}^{l_i \leq c_i} v_{i,j} \leq a_i \quad (4)$$

$$\sum_{0 \leq i \leq M-1} v_{i,j} = 1 \quad (5)$$

In five constraints above, constraints (1) and (2) guarantee that the bandwidth to be reserved on the outbound link of a node should be the smaller one between the aggregated bandwidth requirement of VMs allocated to the sub-tree and that allocated to the rest part of the network. Constraint (3) ensures that the reserved bandwidth in the outbound link is no greater than the residual bandwidth on the link. Constraints (4) and (5) guarantee that the number of VMs allocated to each server does not exceed its number of available VM slots, and each VM should be allocated exactly once. This programming is a non-convex quadratic constraint programming.

Since the acceptability determination problem for heterogeneous bandwidth requests is NP-complete, embodiments of this invention utilizes approximate solutions for the problem. One key difference between homogenous and heterogeneous bandwidth requests is that, for a request of N VMs, the size of the solution space for homogenous bandwidth request is N+1, while the size of the solution space for heterogeneous bandwidth request is $2^N$.

The approximate solutions take a heuristic approach to reduce the computation complexity. The N VMs from a tenant request are divided into many groups. Each group indicates a number of continuous VMs in a sorted request array. A group can be represented by a tuple <x, y>(x≤y), if in the original ordered request array, the starting VM index and the ending VM index of the set are x and y respectively. There should be in total N(N+1)/2 groups. On each node i, an AR for every group is calculated and maintained. $AR^{x,y}(i)$ denotes the AR for group <x, y>. The length of $AR^{x,y}(i)$ is y−x+2 bits. If an arbitrary VM set of size n in group <x, y> can be allocated into the sub-tree rooted from node i, the n-th leftmost bit of $AR^{x,y}(i)$ is set as 1.

Figure 4:
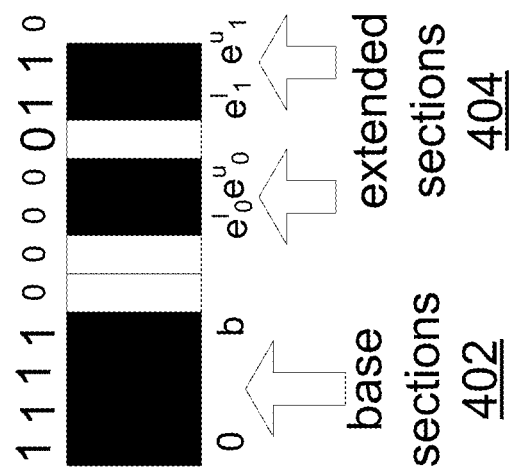
FIG. 4 is a block diagram illustrating an allocation range for a node according to one embodiment of the invention.

FIG. 4 is a block diagram illustrating an allocation range for a node according to one embodiment of the invention. A node can be a virtual switch or a server. An AR can have several continuous feasible solution spaces. For convenience, the first continuous feasible solution space is called the basic section (illustrated as base section 402), and the other feasible solution spaces are called the extended sections (illustrated as extended sections 404). One may use an array of lower bounds and upper bounds to denote these sections, and it is in the form of $\{[0, b], [e^l_0, e^u_0] \ldots [e^l_k; e^u_k]\}$, where b is the upper bound of the basic section, $e^l_q$ and $e^u_q$ are the lower bound and the upper bound of the $q^{th}$ extended section, respectively. The lower bound of the basic section is 0 because allocating no VMs into a sub-tree is always a feasible solution. A known AR represents a known feasible space for allocating VMs to a requesting tenant, thus the calculating of AR is a key component of resource allocation.

FIG. 4 shows the structure of an AR containing 11 bits (12−3+2=11). $AR^{3,12}(i)$ denotes allocation spaces for VM3 to VM12. The 0-th leftmost bit is always one as the node always can be set not to accommodate any VM. The base section 402 indicates that the node may accommodate VM3-VM5. The extended sections 404 indicate that the node may accommodate VM8-VM9, and VM11-12. A node has a set of ARs for a request of a set of VMs. For example, if a tenant requires VM1-VM12 at node 200, $AR^{3,12}(200)$ is one out of 78 ARs for node 200 (12×13÷2=78). Note, a bit stream is only one embodiment of AR. AR may be implemented in different ways yet still embody the inventive idea discussed within. For example, an AR may be implemented as an array with each element of the array representing allocation of a particular VM to a requesting tenant. An AR may also be implemented as a numeric value converted from a binary bit stream.

Figure 5:
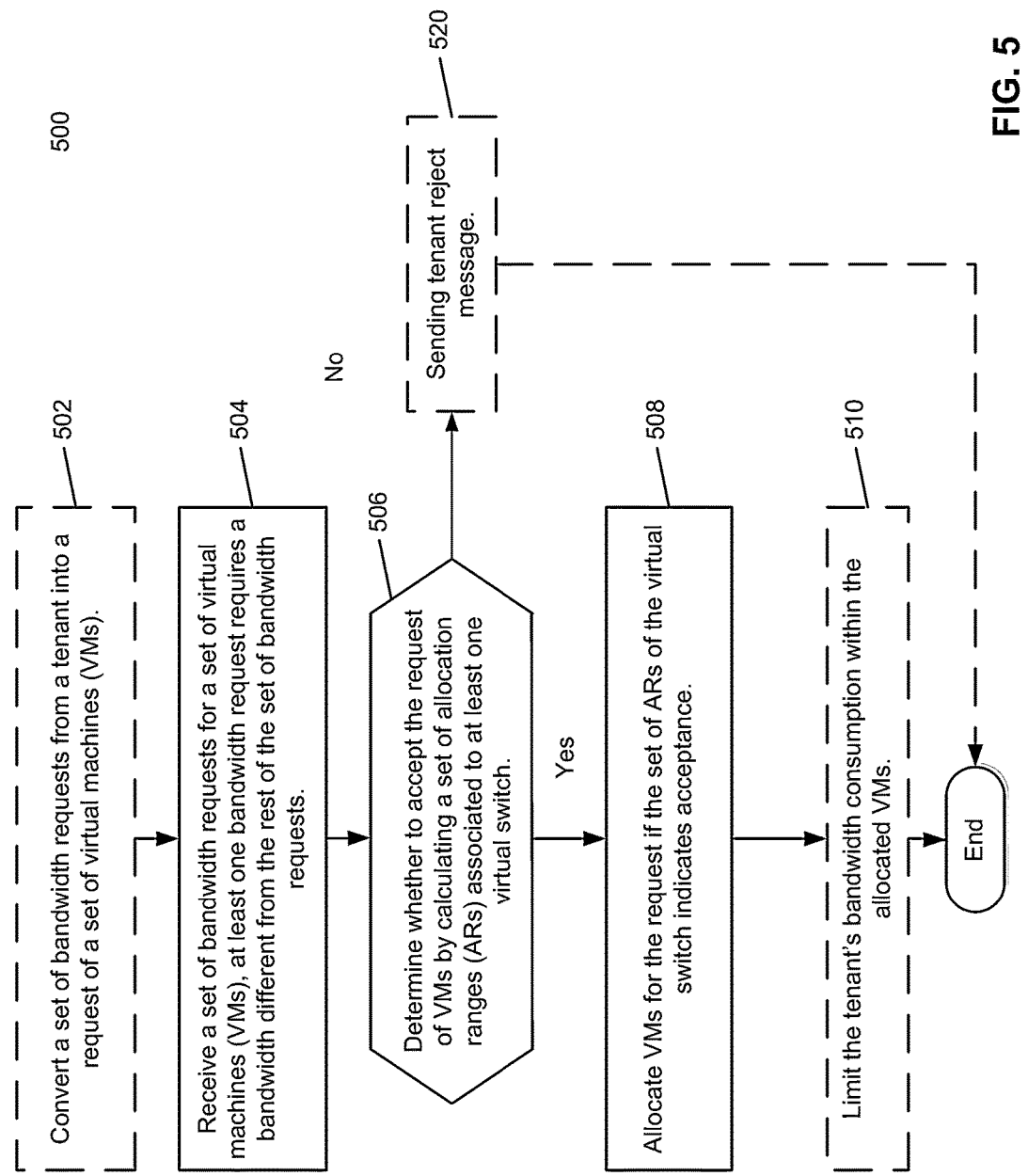
FIG. 5 is a flow diagram illustrating a bandwidth allocation method according to one embodiment of the invention.

FIG. 5 is a flow diagram illustrating a bandwidth allocation method according to one embodiment of the invention. The process may optionally starts with the receiving of a set of bandwidth requests from a tenant, where the set of bandwidths requests is converted to a request for a set of VMs at block 502. The entity receiving the request may be a root virtual switch, a network manager managing virtual switches, or an orchestrator within the orchestration layer of the network service provider.

At block 504, the request of a set of VMs is received by at least a virtual switch. The VMs within the set are not homogenous, and at least one VM consumes bandwidth differently from the rest of the VMs. The virtual switch calculates a set of ARs and determines if it has enough resources to support the requesting tenant at block 506. If the request can be accommodated, VMs will be allocated for the request at block 508. If the request cannot be accommodated, optionally a reject message is sent back to the requesting tenant at block 520 and the process ends. The tenant may make the request to a different virtual switch, or it may change the set of bandwidth requests and try again.

If the virtual switch allocates VMs to the requesting tenant, it may limit the tenant's bandwidth consumption within the allocated VMs at block 510.

Figure 6:
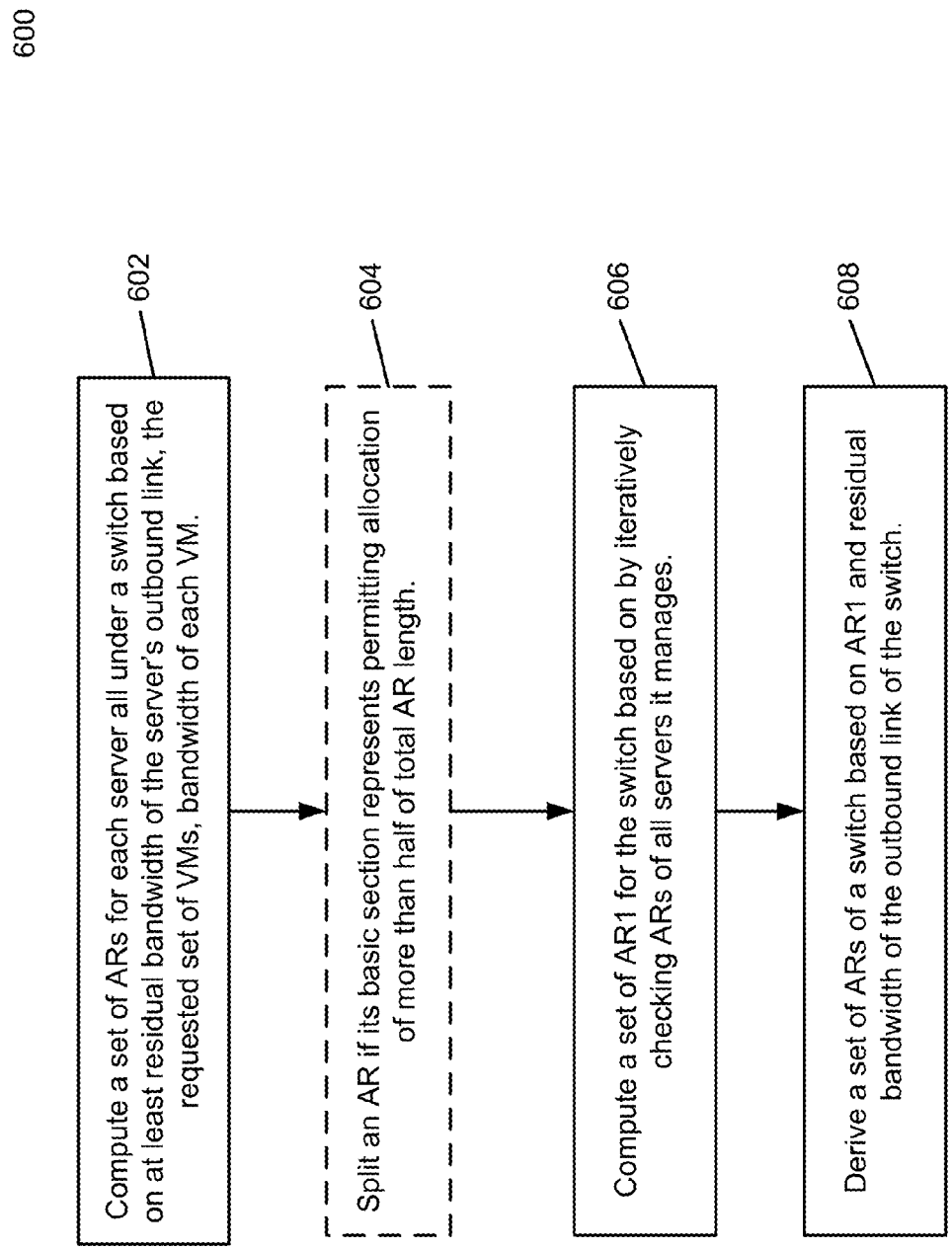
FIG. 6 is a flow diagram illustrating computing a set of ARs of a virtual switch according to one embodiment of the invention.

FIG. 6 is a flow diagram illustrating computing a set of ARs of a virtual switch according to one embodiment of the invention. The calculation of the set of ARs of a virtual switch starts with computing of ARs of all servers under the virtual switch at block 602. In one embodiment, the calculation depends at least on the available of VMs of the servers, residual bandwidth of the servers to its outbound links to a virtual switch, the requested set of VMs (e.g., VM numbers and bandwidth types), and the bandwidth of each VM of the server. If a calculated AR of a virtual server contains more than half of the requested VMs, the AR may be split into half at block 604. Then by iteratively checking the ARs of the servers it manages, one derives the $AR_1$ for the switch at block 606. $AR_1$ is the AR without considering the residual bandwidth of an outbound link of the virtual switch to another virtual switch within the network. Then at block 608, the virtual switch adds the consideration of residual bandwidth and derives the set of ARs of the virtual switch. Note that computing of restraint based the residual bandwidth of an outbound link of the virtual switch to another virtual switch within the network can be denoted as $AR_2$, and its computation has been disclosed in co-pending application U.S. patent application Ser. No. 13/663,416 detailed in paragraph [0001] of this specification.

As discussed herein above, the acceptability determination problem for heterogeneous bandwidth request is a NP-complete problem and approximate solutions are desirable. Embodiments of the invention take a heuristic approach and divide a request of a set of VMs into many groups. A group indicates a number of continuous VMs in a sorted request array and denoted by $AR^{x,y}(i)$ for group <x, y> at node i.

For AR computation, the first step is to compute ARs for each server (see block 602 of FIG. 6). For server i with a available VM slots and residual bandwidth c in the out-link, the feasible solution space constrained by VM slots is:

$$AR^{x,y}_1(i)=[0; \min(a,y-x+1)].$$

As for the feasible solution space constrained by the outbound link capacity, if $c \geq (\Sigma_{j=0}^{N-1} B_j)/2$, then any VM set can be put into the server, and we have:

$$AR^{x,y}_2(i)=[0,y-x+1].$$

Otherwise, for similar reasons with homogeneous requests, it is supposed that:

$$AR^{x,y}_2(i)=[0;u] \cup [l; y-x+1]$$

To take the worst cases into account, when calculating the upper bound u of the first continuous space and the lower bound l of the second continuous space, one should ensure that the VM sets with the highest possible bandwidth requirements from the group can be allocated. As a result, $$\begin{cases} u = \max n: \left\{ \left( \sum_{j=y-n+1}^{y} b_j \right) \leq c, n \leq y-x+1 \right\} \\ l = \min n: \left\{ \left( \sum_{j=x}^{x+n-1} b_j \right) \geq \left( \sum_{j=0}^{N-1} B_j \right) - c, n \leq y-x+1 \right\} \end{cases}$$

Note when no proper value for l is found, it indicates that the second continuous space does not exist.

Basic section may be split in some scenarios. $AR^{x,y}(i)$ is the intersection of $AR^{x,y}_1(i)$ and $AR^{x,y}_2(i)$. If $(\Sigma_{j=x}^{y} B_i) \geq (\Sigma_{j=0}^{N-1} B_i)/2$, one may conduct basic section splitting. The splitting point is max n:

$$\left\{ \left( \sum_{j=y-n+1}^{y} b_j \right) \leq \frac{\sum_{j=0}^{N-1} B_j}{2}, n \leq y-x+1 \right\}.$$

After ARs for servers are computed, a set of ARs for a switch managing the servers is computed. $AR^{x,y}(i)$ of switch i is the intersection of $AR_1(i)$, which is aggregated from the ARs of its children nodes, and $AR_2(i)$, which is constrained by the residual bandwidth of the outbound link $AR^{x,y}_2(i)$. $AR^{x,y}_2(i)$ is calculated in the same way as in computing ARs for servers. Thus, the discussion herein below focuses on computing $AR_1(i)$.

Generally speaking, $AR^{x,y}_1(i)$ should be aggregated from the basic section and extended sections in the AR of each child node j. There can be at most one extended section used for each aggregation, since the summed bandwidth of VMs from two extended sections will exceed the total bandwidth requirement of any VM set. As for the aggregation of the basic sections from ARs of the children nodes, a naive way is to simply sum up all $b^{x,y}(j)$ s from every child node j. But in this way many feasible solutions will be missed. An example illustrates the problem. Assume we calculate $AR^{6,20}_1(i)$ for a switch i, which has two children nodes $j_1$ and $j_2$. The upper bounds of basic sections in $AR^{x,y}(j_1)$ and $AR^{x,y}(j_2)$ for multiple groups are shown as follows:

$$\begin{bmatrix} b^{6,14}(j_1) & b^{6,20}(j_1) \\ b^{6,15}(j_2) & b^{6,20}(j_2) \end{bmatrix} = \begin{bmatrix} 7 & 5 \\ 9 & 6 \end{bmatrix}$$

If we make naive aggregation of basic sections with the same group of the AR, we have $b^{6,20}(i)=b^{6,20}(j_1)+b^{6,20}(j_2)=11$. However, note that we preferably consider VMs with the highest bandwidth requirements when calculating $b^{x,y}(i)$. Hence, when we have allocated n(j) VMs to a child node j, the maximum sequence of the rest VMs in the set is at most y−n(j). Therefore, we may be able to allocate more VMs since if the maximum VM sequence of the set is lower, the set can be put into a group with lower y, and the worst case bandwidth requirement of the group will be smaller. In this example, since child node $j_1$ can host five VMs with the highest bandwidth, we can decrease the maximum VM sequence in child node $j_2$ as 20−5=15. In this way, we have $b^{6,20}(i)=b^{6,20}(j_1)+b^{6,15}(j_2)=14$, which increases the solution space compared with the naive aggregation.

If a switch i has r children nodes, there are r! possible orders to aggregate ARs of the children nodes. Different orders may have different results. In the example above, we can also get $b^{6,20}(i)$ from $b^{6,20}(j_2)+b^{6,14}(j_1)=13$. Instead of enumerating all r! possible orders, embodiments of the invention use a greedy method, i.e., the children node with the highest upper bound of the basic section are preferably considered.

Figure 7:
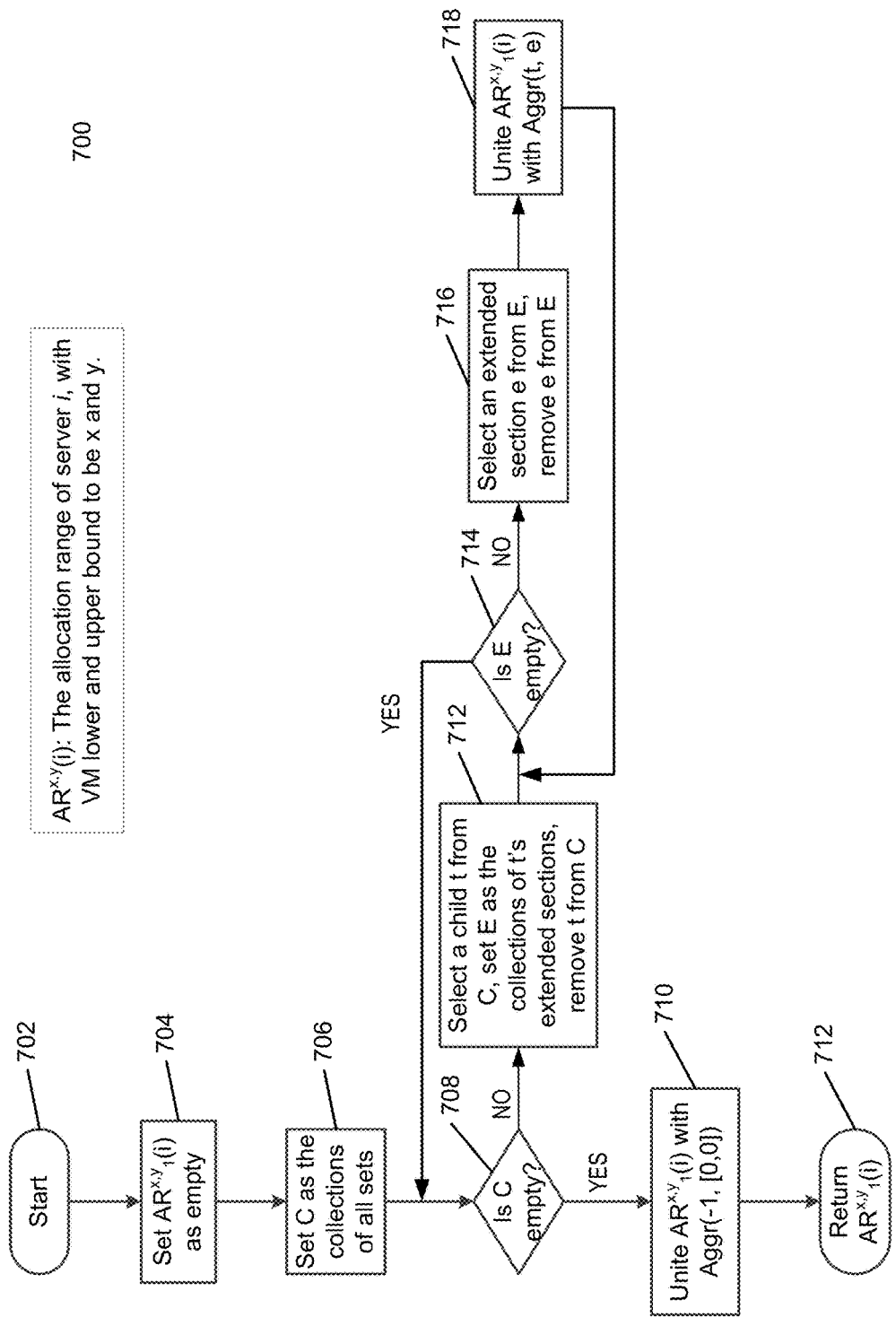
FIG. 7 is a flow diagram illustrating calculation of AR for a physical server according to one embodiment of the invention.

FIG. 7 is a flow diagram illustrating calculation of AR for a physical server according to one embodiment of the invention. The method starts at block 702 and at block 704, $AR^{x,y}_1(i)$ is set to be empty. Then at block 706 a C is set as the collections of all sets. If C is empty, then the computing device units $AR^{x,y}_1(i)$ with aggregation set Aggr $(-1, [0,0])$ at block 710 and then returns $AR^{x,y}_1(i)$ at block 712.

When the C is not an empty set. The computing device selects a child t from C, and sets E as the collections of t's extended sections, and removes t from C at block 712. Then at block 714, the computing device determines whether E is empty. If it is, the computing device goes back to block 708. If it is not empty, the computing device selects an extended section e from E, and removes e from the set E at block 716. Then at block 718, the computing device unites $AR^{x,y}_1(i)$ with aggregation set Aggr (t, e). The computing device then returns to block 714 and executes blocks 716-718 until all extended sections have been processed.

Note the computation of AR(i) of a physical server may be executed by different devices within the network. It may be calculated by the server itself, a hypervisor of a VM, a virtual switch, or a different network manager.

Figure 8:
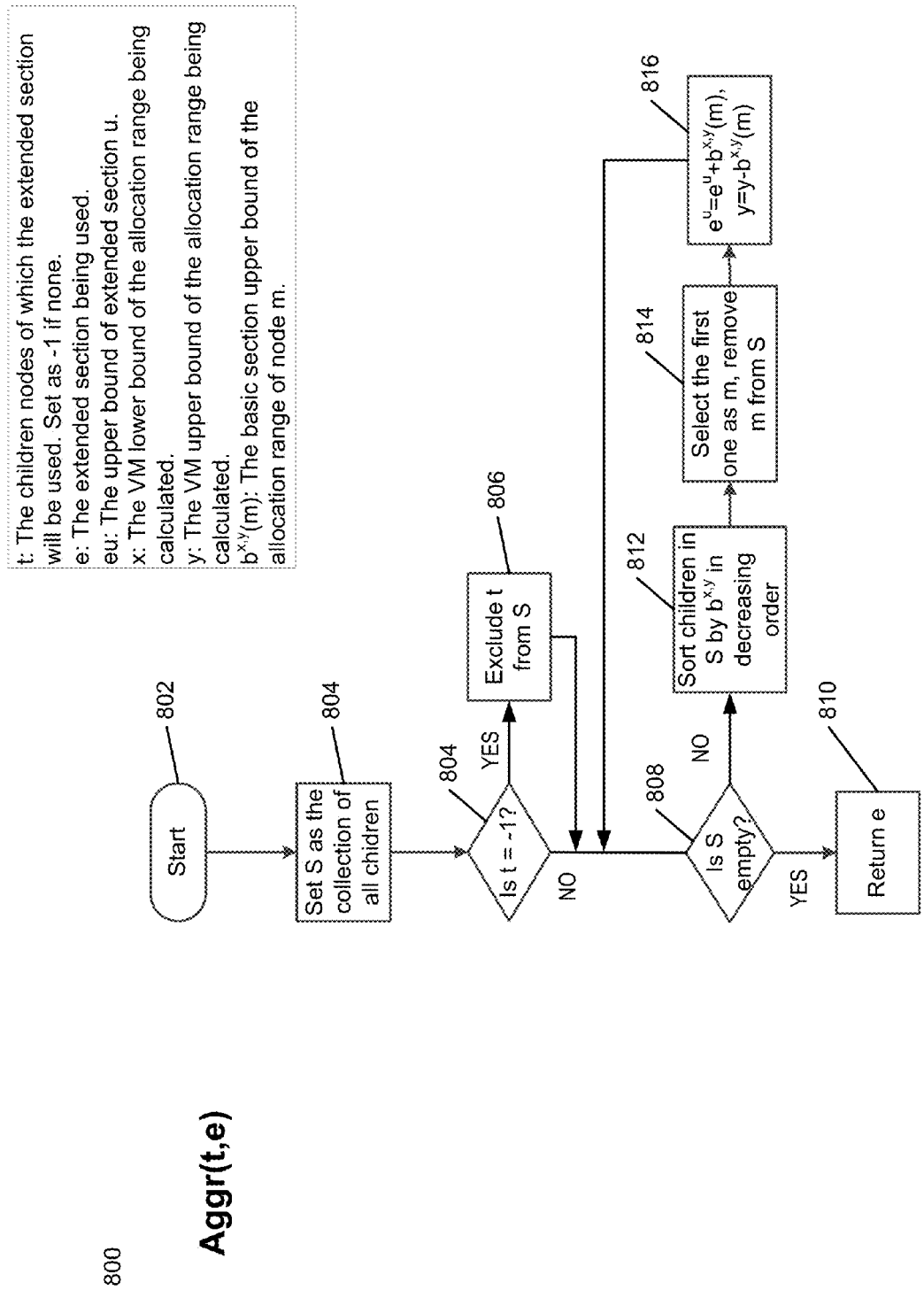
FIG. 8 illustrates the computation of aggregation set for solution space according to one embodiment of the invention.

In FIG. 7, the aggregation set Aggr (t, e) is utilized. FIG. 8 illustrates the computation of aggregation set for solution space according to one embodiment of the invention. In one embodiment, method 800 is a subset of method 700 illustrated in FIG. 7. Referring to FIG. 8, the method starts with block 802. A computing device setting S as the collection of all children nodes at block 804. At block 804, it checks if the extended section of a child's node will be used. If it excludes the child node t from set S. The computing device then determines if S is empty at block 808. If it is empty, the resulting e is returned for Aggr (t, e) for the child. If S is not empty, the computing device sorts all children in S by $b^{x,y}$ in decreasing order at block 812. Then the computing device selects the first one as m, and removes m from set S. Then it sets e and y and returns to block 808.

The computation of $AR^{x,y}_1(i)$ can also be illustrated in pseudo code. FIG. 9 illustrates a pseudo code procedure utilized to calculate $AR^{x,y}_1(i)$ on node i according to one embodiment of the invention.

After computing $AR^{x,y}_1(i)$, the computing device may intersect $AR^{x,y}_1(i)$ with $AR^{x,y}_2(i)$ on a switch i. Thus the computing device derives $AR^{x,y}(i)$, and $AR^{x,y}(i)$ can be used to make acceptance decision as illustrated in FIG. 5.

After determining a node can host the tenant's request of a set of bandwidth requests, where the set of bandwidth request is heterogeneous, a computing device (which may or may not be the same computing device that makes the acceptance determination) then assigns a set of VMs for the request. The set of VMs can be assigned to a sub-tree under the node in a top-down recursive way from the root of the node. In one embodiment, the computing device allocates the VMs to an extended section with the highest upper bound from children nodes. When allocating the VMs into the basic sections of children node, one embodiment tries to use as few children nodes as possible to ensure a complete allocation, Another embodiment allocates VMs in the same order as in aggregation, i.e., the children node with the highest bound of the basic section first, to ensure a complete allocation.

Figure 10:
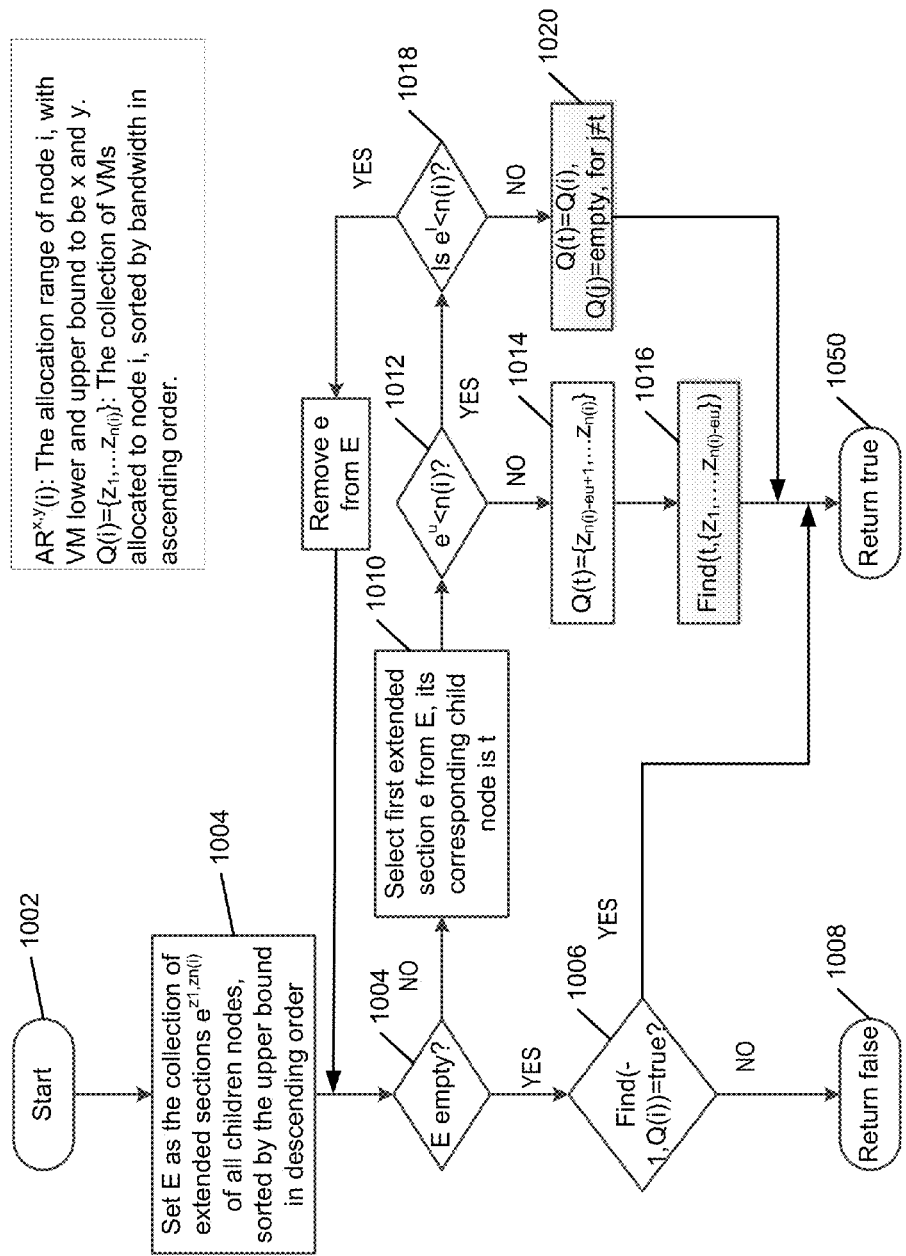
FIG. 10 illustrates allocating sets of VMs at extended sections within the control of a virtual switch according to one embodiment of the invention.

FIG. 10 illustrates allocating sets of VMs at extended sections within the control of a virtual switch according to one embodiment of the invention. The process allocates a set of n VMs and a subset of VM, Q(j), to each server j under management so that the combination of all Q(j) equals to the total number n. Because the process may be applied to a virtual network with multiple levels of virtual switches and servers, generic terms are used. To use the process of FIG. 11 at a virtual switch controlling physical servers, a node is a virtual switch and a child is a physical server.

The process starts at block 1002. At block 1004, a computing device sets a set E as the collection of extended section $e^{zl,zn(i)}$ of all children nodes, sorted by the upper bound in descending order. At block 1004, the computing device determines whether the set E is empty. If it is empty and no suitable Q (i) can be found at block 1006, the process complete without an allocation at block 1008. If the set E is not empty, the computing device selects first extended section e from E and its corresponding child node t at block 1010. At block 1012, the computing device determines whether $e^u < n(i)$ is true. If it is not true, the computing device calculates Q(t) at block 1014, and finds the allocation for child node t at 1016 and return true at block 1050 to indicate a successful allocation. Otherwise, the computing device determines if $e^l < n$ (i) is true. If it is not true, Q (t) is assigned at block 1020, and then the process goes to return true at block 1050. If it is true, e is removed from set E, and the process returns to block 1004.

Once all the servers with extended sections go through the process, the process ends either with no allocation at block 1008 or with specified allocation at block 1050, and the allocation of extended sections is accomplished.

Figure 11:
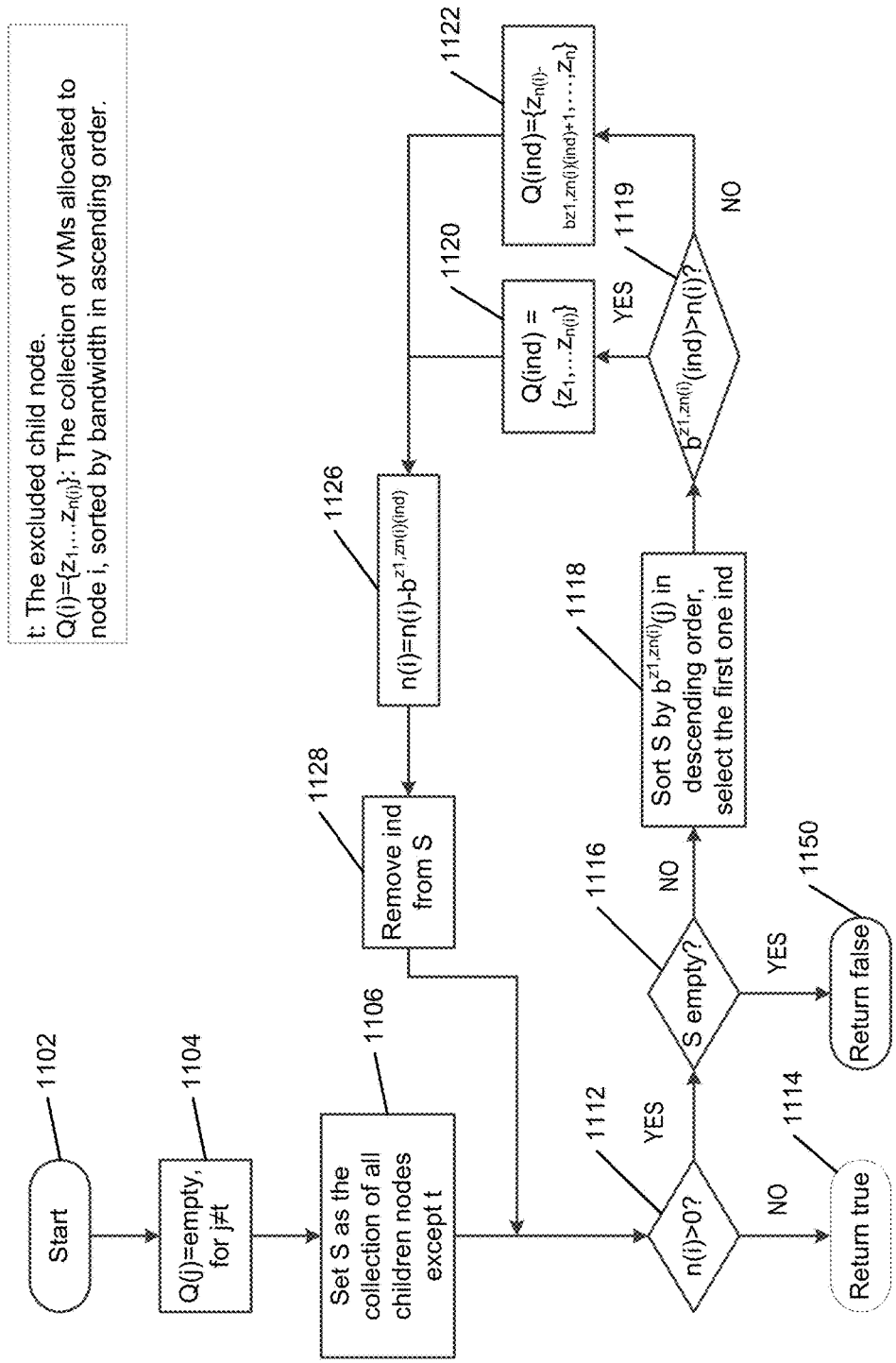
FIG. 11 illustrates allocating VMs at basic sections within the control of a virtual switch according to one embodiment of the invention.

FIG. 11 illustrates allocating VMs at basic sections within the control of a virtual switch according to one embodiment of the invention. Allocating extended sections of available servers as illustrated in FIG. 10 is only a part of the VM allocation process. The process needs to allocate basic sections too. Referring to FIG. 11, the process of allocating basic sections start at block 1102. Then at block 1104, Q(i), the allocation is set to zero for the excluded child node t. A set S is used as the collection of all children nodes except node t at block 1106. Then at block 1112, the computing device determines whether n(i)>0. If it is not, a selection has complete, the process completes with returning turn at block 1114. Otherwise, the process continues at block 1116, where the computing device determines whether S is empty. If it is empty, no basic section has been selected, and the process completes with returning false at block 1150. If S is not empty, then the computing device sorts S by $b^{zl,zn(i)}$ in descending order, and selects the first one ind at block 1118. Then at block 1119, the computing device determines whether $b^{zl,zn(i)} > n(i)$. If it is, then Q(ind) is determined at block 1120, and n(i) is set at block 1126, and ind is removed from set S at block 1128. If it is not, Q(ind) is also determined with a different value at block 1122, and the process also goes to block 1126.

All the children nodes (e.g., physical servers) of switch i go through the process and the process ends with either basic section allocation at block 1120 or no allocation applicable at block 1108. Note that the order of computing allocation of extended sections and basic sections is reversed in some embodiments.

Figure 12:
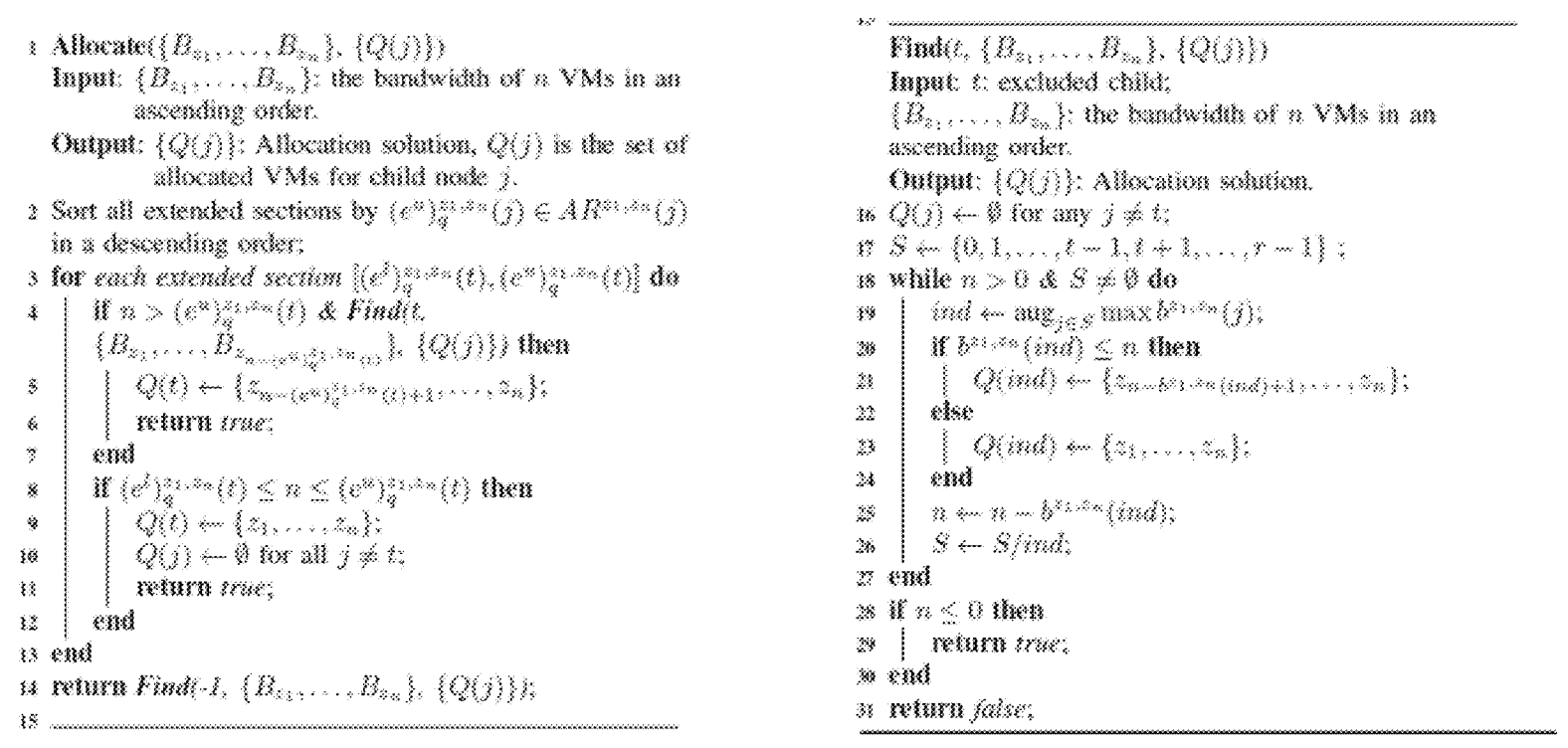

The process of allocating both extended sections and basic sections can also be expressed as pseudo code. FIG. 12 illustrates allocating the set of VMs to each child node j on node i for heterogeneous bandwidth request according to one embodiment of the invention.

Figure 13:
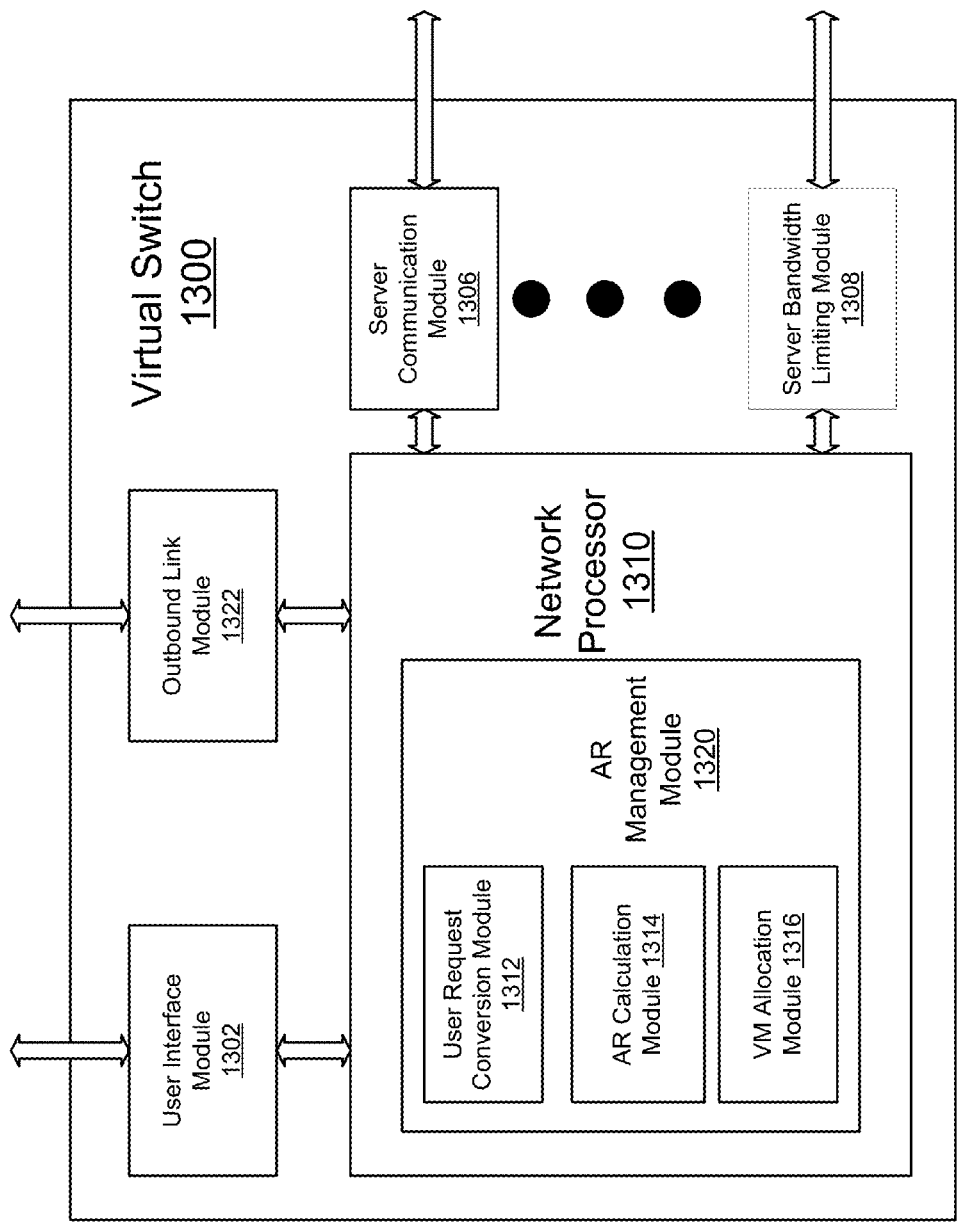
FIG. 13 is a block diagram illustrating a virtual switch configured to allocate bandwidth according to one embodiment of the invention.

FIG. 13 is a block diagram illustrating a virtual switch configured to allocate bandwidth according to one embodiment of the invention. Virtual switch 1300 contains a network processor 1310. For bandwidth allocation purpose, an AR management module 1320 is configured for managing AR calculation and related operations. Note AR management module 1320 may share a network processor with other processes/modules within the virtual switch, and it may also have a dedicated network processor for the sole purpose of managing ARs and allocating VMs.

Virtual switch 1300 contains a user interface module 1302. If virtual switch 1300 is a root virtual switch or a virtual switch in charge of interfacing directly with tenants requesting bandwidth, user interface module 1302 receives bandwidth request (e.g., a number of Mbps). Note the bandwidth request can be heterogeneous, thus a number of different bandwidth requests may be received by a single tenant. In that case, a set of bandwidth requests from a tenant/user is sent to a user request conversion module 1312 within AR management module 1320. A set of bandwidth requests is converted to a set of VMs at user request conversion module 1312. Note the VMs within the set are not identical and at least one VM consumes different bandwidths from the rest of VMs. If virtual switch 1300 is a switch of a virtual switch group, user interface module 1302 receives a request of a set of VMs as tenant's bandwidth requests have been converted to the set of VMs already. Virtual switch 1300 also contains an outbound link module 1322.

Outbound link module 1322 can be configured to interact with upper level virtual switches or switches of its peers. Outbound link module 1322 determines residual bandwidth of outbound links and provides the information to AR management module 1320 in one embodiment. Particularly, residual bandwidth of outbound links is needed to calculate a set of ARs for virtual switch 1300 at AR calculation module 1314. In AR management module 1320, another module is VM allocation module 1316, where determination is made on how to allocate specific VMs on physical servers to a request. Also in virtual switch 1300, server communication module 1306 can be configured to communicate with servers under its management. Sever communication module 1306 may be also configured to determine residual bandwidths of its links to servers under its management. As discussed herein above, residual bandwidth on the links between virtual switch and servers are needed to calculate a set of ARs of servers. In some embodiment, virtual switch 1300 also contains a server bandwidth limiting module 1308. Server bandwidth limiting module 1308 limits a tenant's bandwidth consumption within the allocated VMs, thus a tenant gets bandwidth no more than it has been allocated. Note not all the modules are required to implement the inventive idea within. Some modules are optional, and others modules may be implemented as an integrated module configured to complete several functions within one.

In one embodiment, virtual switch 1300 receives a set of bandwidth requests from a tenant at user interface module 1302. It converts the set of bandwidth requests to a request of a set of VMs at user request conversion module 1312. The VMs within the set is not homogeneous and at least one VM needs to contain a bandwidth different from the rest of VMs in the set. Then virtual switch 1300 determines whether or not to accept the set of bandwidth requests by calculating a set of VMs at AR calculation module 1314. The AR calculation module 1314 may interacts with server communication module 1306 to collect residential bandwidth information about links connecting to virtual switch 1300. If virtual switch determines to accept the request, it allocates VMs to the request through VM allocation module 1316. Otherwise, it may send a rejection message through user interface module 1302 indicating the request is rejection. Virtual switch 1300 may further monitor VM usage by the tenant and limit the tenant's usage within the allocated VM using server bandwidth limiting module 1308.

The operations of the flow diagram have been described with reference to the exemplary embodiment of FIG. 13. However, it should be understood that the operations of flow diagrams can be performed by embodiments of the invention other than those discussed with reference to FIGS. 5-6, 7-8 and 10-11, and the embodiments discussed with reference to FIG. 13 can perform operations different than those discussed with reference to the flow diagrams of FIGS. 5-6, 7-8 and 10-11.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network service provider to provide a virtual network to tenants requiring bandwidth in a cloud computing environment, wherein the virtual network includes a first set of virtual switches that manage a set of one or more physical servers that host virtual machines (VMs), the method comprising:
receiving by at least one virtual switch a request for a first plurality of VMs, wherein at least one VM of the first plurality of VMs contains a bandwidth different from bandwidths of the rest of one or more VMs within the first plurality of VMs;
determining whether to accept the request for the first plurality of VMs by calculating a set of allocation ranges (ARs) associated to the at least one virtual switch, wherein each AR of the set of ARs denotes at least one discontinuous allocation of VMs within the at least one virtual switch; and
allocating VMs for the request for the first plurality of VMs in response to the determination of accepting the first plurality of VMs.

2. The method of claim 1, wherein the request for the first plurality of VMs is converted from a set of bandwidth requests by a tenant.

3. The method of claim 1, wherein each AR of the set of ARs is a data structure that contains a number of bits indicating none or a number of VMs within the first plurality of VMs that are available for allocation.

4. The method of claim 1, wherein each AR of the set of ARs of the at least one virtual switch is calculated based in part on a residual bandwidth of an outbound link of the at least one virtual switch and ARs associated with a second set of one or more physical servers managed by the at least one virtual switch.

5. The method of claim 4, wherein the set of ARs associated with the second set of one or more physical servers are calculated based in part on residual bandwidths of outbound links of the second set of one or more physical servers and a second plurality of VMs of the second set of one or more physical servers.

6. The method of claim 4, wherein each AR of the set of ARs associated with a physical server of the second set of one or more physical servers is a data structure that contains a number of bits equal to two plus a difference between index numbers of two VMs, wherein the first plurality of VMs are sorted based on a number of VM slots required.

7. The method of claim 6, wherein each AR of the set of ARs contains a continuous basic section and at least one extended section.

8. The method of claim 7, wherein a length of the continuous basic section is less than half of a total length of each AR.

9. The method of claim 1, wherein the first set of virtual switches are configured hierarchically with at least two levels, a higher level virtual switch managing at least one lower level virtual switch.

10. The method of claim 1, wherein the VMs are allocated to servers in order from a server with a highest allowable extended section upper bound of an AR to rest of servers with lower allowable extended section of ARs.

11. The method of claim 1, further comprising limiting tenant bandwidth consumption within the allocated VMs to a tenant.

12. The method of claim 1, further comprising sending a tenant a rejection message in response to the determination of rejecting the request for the first plurality of VMs.

13. A network device serving as at least one virtual switch for a network service provider to provide a virtual network to a tenant requiring bandwidth in a cloud computing environment, wherein the virtual network includes a first set of virtual switches that manage a set of one or more physical servers that host a first plurality of virtual machines (VMs), the network device comprising circuitry configured to:
receive a request for the first plurality of VMs, wherein at least one VM of the first plurality of VMs contains a bandwidth different from bandwidths of the rest of one or more VMs within the first plurality of VMs;
calculate a set of ARs associated to the at least one virtual switch to determine whether to accept the request of the first plurality of VMs by calculating a set of allocation range (ARs) associated to the at least one virtual switch, wherein each AR of the set of ARs denotes at least one discontinuous VM allocation space within the at least one virtual switch; and
allocate VMs for the request for the first plurality of VMs in response to the determination to accept the first plurality of VMs,
wherein the VMs are allocated to servers in order from a server with a highest allowable extended section upper bound of an AR to rest of servers with lower allowable extended section of ARs.

14. The network device of claim 13, wherein the circuitry is further configured to:
receive a set of bandwidth requests for the tenant; and
convert the set of bandwidth requests from the tenant into a request of the first plurality of VMs.

15. The network device of claim 13, wherein each AR of the set of ARs is a data structure that contains a number of bits indicating none or a number of VMs within the first plurality of VMs that are available for allocation.

16. The network device of claim 13, wherein the circuitry is further configured to communicate with a second set of one or more physical servers managed by the network device, wherein each AR of the set of ARs of the network device is calculated based in part on a residual bandwidth of an outbound link of the network device and ARs associated with the second set of one or more physical servers.

17. The network device of claim 16, wherein the set of ARs associated with the second set of one or more physical servers are calculated based in part on residual bandwidths of outbound links of the second set of one or more physical servers and a second plurality of VMs of the second set of one or more physical servers.

18. The network device of claim 16, wherein each AR of the set of ARs associated with a physical server of the second set of one or more physical servers is a data structure that contains a number of bits equal to two plus a difference between index numbers of two VMs, wherein the first plurality of VMs are sorted based on a number of VM slots required.

19. The network device of claim 18, wherein each AR of the set of ARs contains a continuous basic section and at least one extended section.

20. The network device of claim 19, wherein the circuitry is further configured to split ARs so that for each AR, a length of the continuous basic section is less than half of a total length of the AR.

21. The network device of claim 13, wherein the first set of virtual switches are configured hierarchically with at least two levels, a higher level virtual switch managing at least one lower level virtual switch.

22. The network device of claim 13, wherein the circuitry is further configured to limit tenant bandwidth consumption within the allocated VMs to the tenant.

23. The network device of claim 13, wherein the circuitry is further configured to send a tenant rejection message upon the determination that the request cannot be satisfied.

24. A method implemented by a network service provider to provide a virtual network to a tenant requiring bandwidth in a cloud computing environment, and wherein the virtual network includes a first set of one or more virtual switches that manage a set of one or more physical servers that host virtual machines (VMs), the method comprising:
converting a set of bandwidth requests from the tenant into a request of a second plurality of VMs;
receiving by at least one virtual switch a request of a first plurality of VMs, wherein at least one VM of the first plurality of VMs contains a bandwidth different from bandwidths of the rest of one or more VMs within the first plurality of VMs;
determining whether to accept the request of the first plurality of VMs by calculating a set of allocation range (ARs) associated to the at least one virtual switch, wherein each AR of the set of ARs denotes at least one discontinuous VM allocation space within the at least one virtual switch, wherein each AR of the set of ARs denotes at least one discontinuous VM allocation space within the at least one virtual switch, and wherein each AR of the set of ARs is calculated based in part on a residual bandwidth of an outbound link of the at least one virtual switch and ARs associated with a second set of one or more physical servers managed by the at least one virtual switch;
allocating VMs for the request of the first plurality of VMs in response to the determination of accepting the request of the first plurality of VMs in order from a server with a highest allowable extended section upper bound of an AR of the set of ARs to rest of servers with lower allowable extended section upper bound of ARs, followed by allocating in order from a server with an AR of the set of ARs having a lowest upper bound basic section of the AR to rest of servers with higher upper bound basic sections of ARs; and
limiting the tenant's bandwidth consumption within the allocated VMs.

25. A network device serving as at least one virtual switch for a network service provider to provide a virtual network to a tenant requiring bandwidth in a cloud computing environment, wherein the virtual network includes a first set of virtual switches that manage a set of physical servers that host a first plurality of available virtual machines (VMs), the network device comprising circuitry configured to:
receive a bandwidth request from a tenant;

convert the bandwidth request into a request of a first plurality of VMs;

calculate a set of ARs associated to the at least one virtual switch to determine whether to accept the request for the first plurality of VMs by calculating a set of allocation ranges (ARs) associated to the at least one virtual switch, wherein each AR of the set of ARs denotes at least one discontinuous VM allocation space within the at least one virtual switch, each AR of the set of ARs is a data structure that contains a number of bits indicating none or a number of VMs within the first plurality of VMs that are available for allocation to the bandwidth request, and wherein each AR of the set of ARs of the network device is calculated based in part on a residual bandwidth of an outbound link of the network device and ARs associated with a second set of one or more physical servers;

allocate VMs to the tenant in response to the determination to accept the request for the first plurality of VMs in order from a server with a highest allowable extended section upper bound of an AR to rest of servers with lower allowable extended section of AR; and limiting tenant bandwidth consumption within the allocated VMs to the tenant.

* * * * *